United States Patent [19]
Lowen et al.

[11] 3,812,749
[45] May 28, 1974

[54] SEVERING AND DISPENSING FIBROUS MATERIAL
[75] Inventors: Michael David Lowen, London; Ronald Newby, Boreham Wood, both of England
[73] Assignee: John Laing and Son Limited, London, England
[22] Filed: Feb. 23, 1972
[21] Appl. No.: 228,607

[30] Foreign Application Priority Data
Feb. 25, 1971 Great Britain...................... 5426/71

[52] U.S. Cl............................. 83/66, 83/69, 83/98, 83/349, 83/356.3, 83/399, 83/416, 83/422, 83/436, 83/545, 83/674, 83/DIG. 1
[51] Int. Cl............................................. B26d 7/24
[58] Field of Search .......... 83/355, 356.3, 339, 349, 83/422, 436, 62, 66, 367, 416, 261, 69, 444, 98, 399, 545, 674, DIG. 1; 100/53

[56] References Cited
UNITED STATES PATENTS
| | | | |
|---|---|---|---|
| 1,978,826 | 10/1934 | Walton et al..................... | 83/444 X |
| 2,389,783 | 11/1945 | Kennedy................................. | 83/69 |
| 2,441,541 | 5/1948 | Hidzick................................. | 83/261 |
| 2,785,748 | 3/1957 | Stoeser et al. .................... | 83/261 X |
| 2,846,004 | 8/1958 | Fotland................................. | 83/355 |
| 2,961,909 | 11/1960 | Hemker et al. ....................... | 83/349 |
| 3,162,080 | 12/1964 | Hemker............................. | 83/420 X |
| 3,199,391 | 8/1965 | Haner et al. ........................ | 83/69 X |
| 3,388,626 | 6/1968 | Larson.................................. | 83/261 |

Primary Examiner—Frank T. Yost
Attorney, Agent, or Firm—Steward & Steward

[57] ABSTRACT

The present invention relates to an apparatus for severing a predetermined quantity of fiber into short lengths and dispensing same through an air conveyor. The apparatus is powered by compressed air. A pneumatic motor drives the cutter and one of the feed rollers, whilst a pneumatic piston and cylinder arrangement forces a pressure roller into contact with the feed roller when feeding of the material is required. A digital counter which is pre-set to meter the required amount of fibre is indexed by pneumatic pulses generated by the feed mechanism and provides a stop signal to the apparatus when the batch is complete. Low pressure air fluidic devices control the various functions of the apparatus.

15 Claims, 6 Drawing Figures

SEVERING AND DISPENSING FIBROUS MATERIAL

The present invention relates to apparatus for severing natural or synthetic fibrous material and dispensing the cut material in predetermined quantities.

The invention is directed more particularly, although not exclusively, to severing discrete lengths of filamentary plastics material from a reel of the material and dispensing the cut lengths in predetermined quantities into concrete mixes where difficulties have arisen due to the agglomeration of the cut lengths prior to dispensing from a container and in ensuring a sufficiently high rate of discharge of the cut lengths into the concrete during mixing.

It is an object of the invention to provide an apparatus for severing discrete lengths of filmentary material from a reel and dispensing the cut lengths in a manner which overcomes the difficulties referred to above.

The present invention consists in apparatus for severing and dispensing fibrous material comprising, a rotatable cutter, feed rollers for supplying the material to the cutter, a plurality of rollers which guide the material to the feed rollers having certain of said guide rollers pivotally mounted relatively to the remaining guide rollers, said pivotally mounted rollers operating an interlock mechanism which prevents operation of the apparatus in the absence of material, or if it snags and means effecting separation of the feed rollers after a predetermined quantity of the material has been dispensed.

In the accompanying drawings:

FIG. 1 is a front view of a fibre severing and dispensing apparatus according to the present invention, FIG. 2 is a section through the fibre feed and cutter mechanism of the apparatus taken on the line II—II of FIG. 1, FIG. 3 is a section through the fibre guide, supply and snag sensing rollers, also the count wheel of the apparatus taken on the line III—III of FIG. 1, FIG. 4 is a rear view of the count wheel and associated mechanism shown in FIG. 1;

Figure 1:
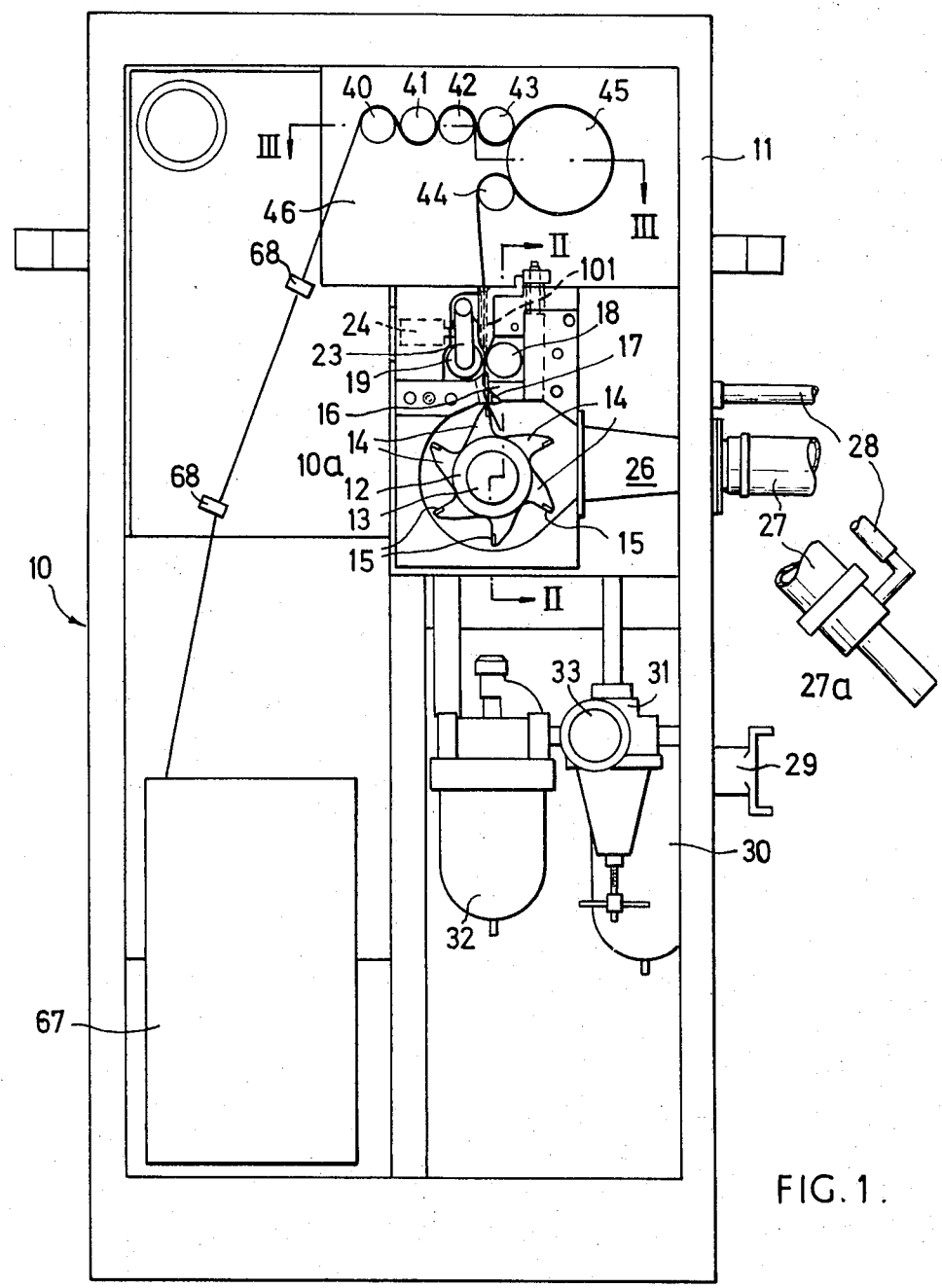
Figure 2:
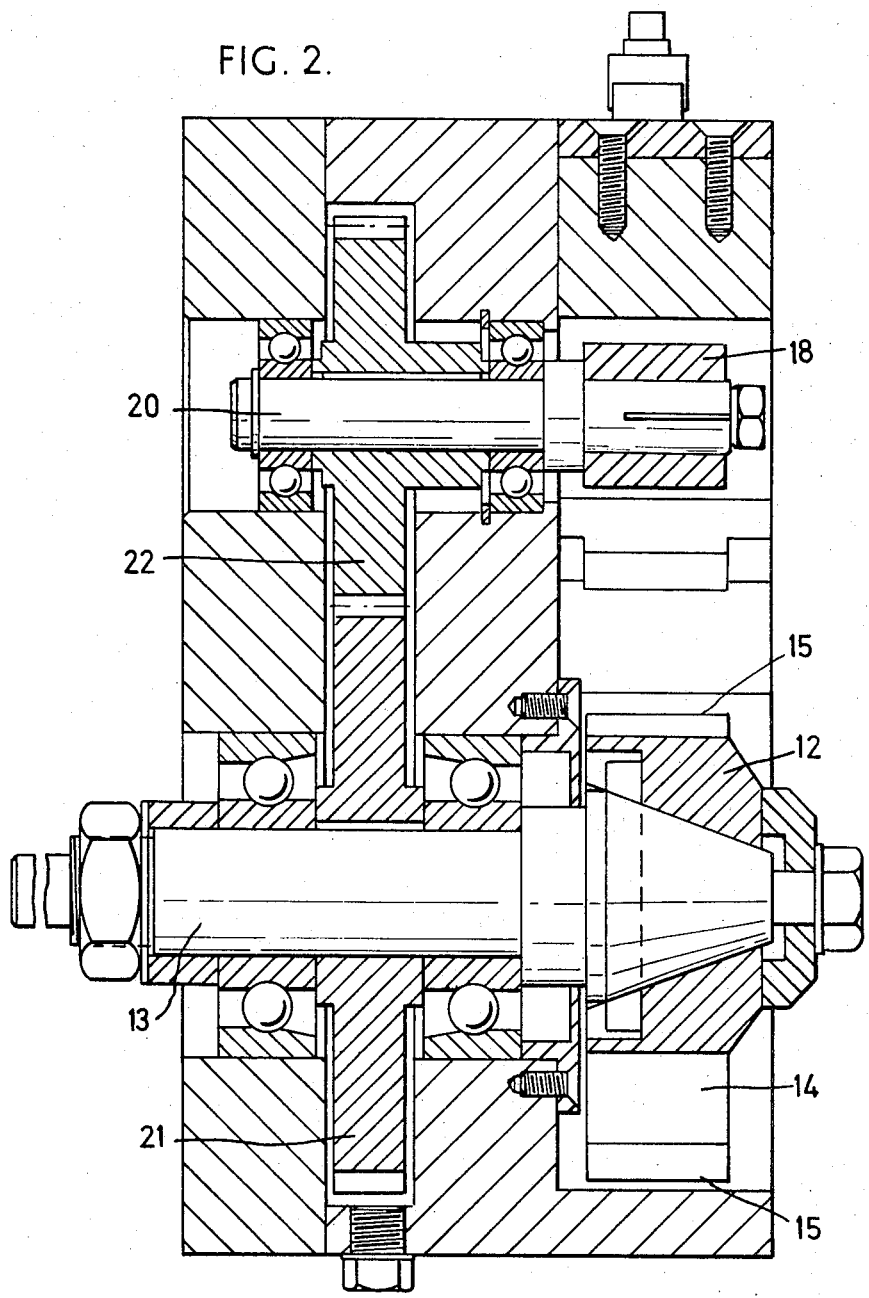
Figure 3:
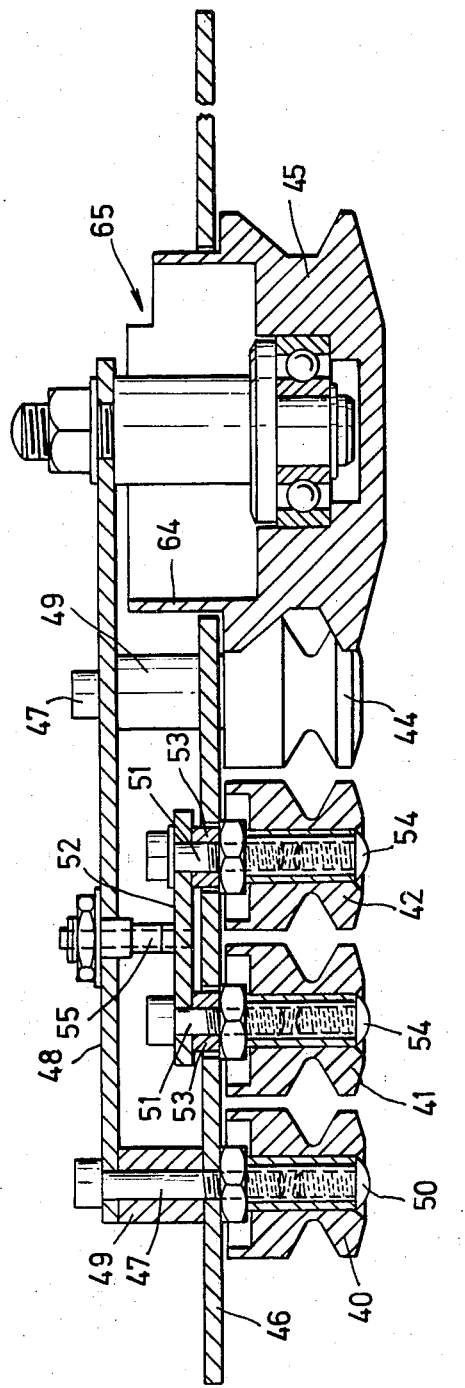

In carrying the invention into effect according to one convenient mode, by way of example, the apparatus comprises a cabinet 10 of generally cuboid configuration having a door (not shown) formed from transparent material, hingedly mounted on a side 11 of the cabinet. The cabinet 10 included a casing 10a which houses a cutter 12 fixedly mounted on a rotatable spindle 13 and having a plurality of teeth 14, the cutting edges 15 of which are disposed parallel to the axis of rotation of the cutter. A stationary, adjustable anvil 16 positioned adjacent the cutter 12 has a cutting edge 17 with which the teeth 14 of the cutter sequentially co-act to effect severance of the filamentary material as hereinafter described. The cutting edges of both the anvil 16 and rotatable cutter 12 are tipped with high speed steel, or tungsten carbide, or other abrasion resistant material.

A feed roller 18 and pressure roller 19 which is movable relatively thereto, have their axes of rotation horizontally disposed and positioned parallel to the axis of rotation of the cutter. The feed roller 18 is mounted on a spindle 20 and is driven by gears 21, 22, from the cutter spindle 13 in a direction opposite to that of the cutter 12 so that its peripheral speed is directly related to the cutter speed and thus the number of cutting edges passing the anvil. The cutter spindle 13 is driven by an air motor 25 (FIG. 6) mounted on the extremity thereof.

Figure 6:
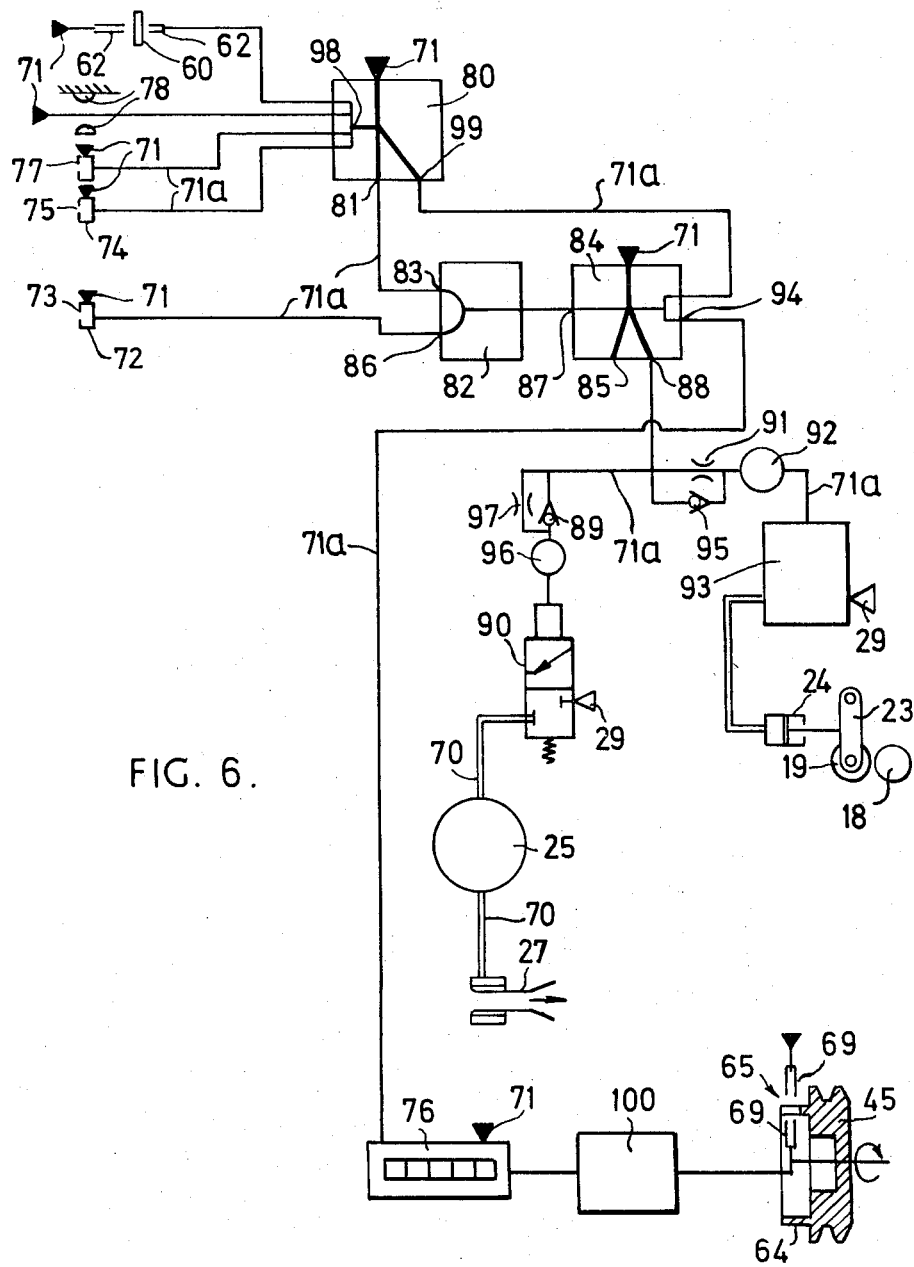
FIG. 6 is a diagrammatic operating and control circuit for the apparatus shown in FIG. 1.

The pressure roller 19 is mounted on a pivotally-mounted arm 23 which is spring-urged away from the feed roller 18 and is connected to a pneumatically operated piston-and-cylinder arrangement 24 which, when required, urges the roller 19 into contact with the feed roller 18 to effect feeding of the filamentary material to the cutter 12. The cutter 12 communicates with a conical outlet passageway 26 through which cut material passes to a flexible conveyor hose 27. A high velocity air flow is induced in the hose 27 by an "Airmover" 27a having an associated air supply hose 28. This induced air flow is drawn from outside the cabinet 10 via a filter of known type mounted in the door which communicates with the cutter cavity in the housing 10a and outlet passageway 26. Compressed air enters the apparatus through a connector 29 and passes through a filter 30, then to the motor 25 via control valve 90 (FIG. 6). A pressure regulator 31 and a lubricator 32. Exhaust air from the motor passes via an oil removing filter and the hose 28 to the "Airmover" 27a. Compressed air also passes through the filter 30 to the piston and cylinder arrangement 24 via a step-up relay 93 (FIG. 6) and to a fluidic control circuit hereinafter described via a pressure reducing valve of known construction, a gauge 33 indicating the supply pressure.

A plurality of roller 40, 41, 42, 43, 44 and a count wheel 45 are mounted on a plate 46 positioned above the cutter and dispensing mechanism hereinbefore described. The rollers 40, 43 and 44 constitute material guide rollers, whilst the rollers 41, 42 in addition to guiding the filamentary material, constitute material snag and sensing rollers.

Figure 4:
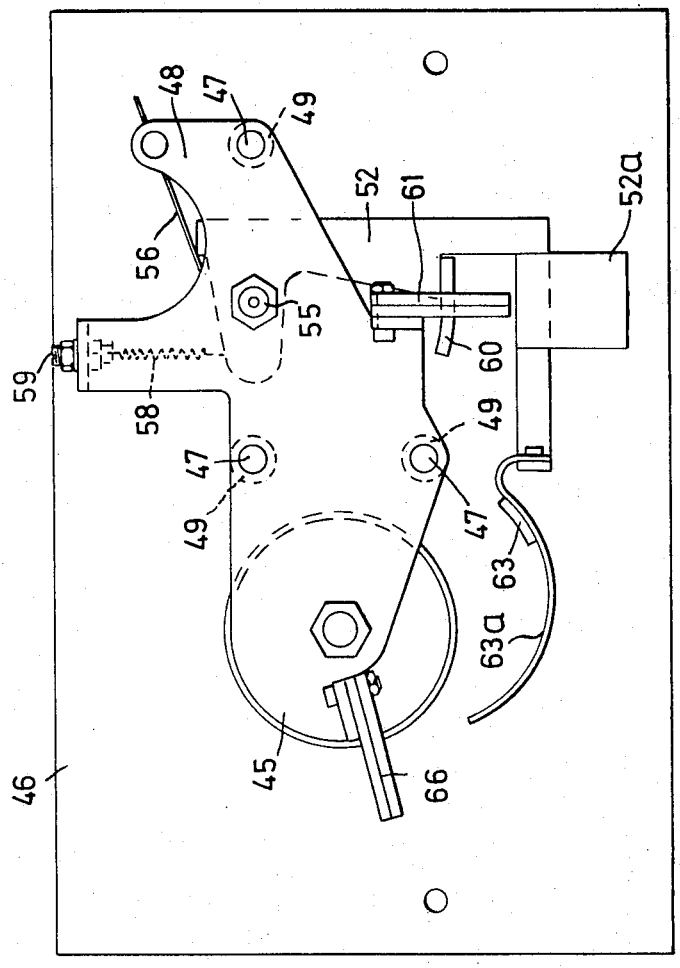
Figure 5:
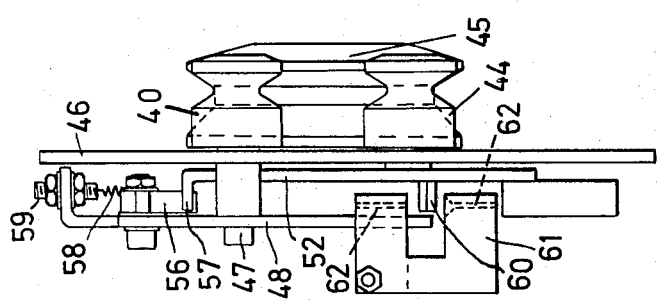
FIG. 5 is a side view of FIG. 4.

The guide rollers 40, 43 and 44 are all rotatably mounted on studs 47 each of which extends through a back plate 48, a spacer member 49 and the plate 46, the rollers being retained on the studs 47 by means of cap screws 50. The snags and sensing rollers 41, 42 are rotatably mounted on studs 51 each of which extends through a plate 52 and a spacer member 53, the rollers being retained on the studs 51 by means of cap screws 54. The plate 52 is capable of pivotal movement relatively to the plate 46 and is mounted on a pivot pin 55 fixedly mounted on the back plate 48. The plate 52 is urged in a clockwise direction, as viewed in FIG. 4, by means of a leaf spring 56 which engages a flange 57 of the plate and a tension spring 58 which extends between the top of the plate 52 and a tension-adjusting screw 59. The plate 52 is provided with an inertia block 52a.

The plate 52 is provided with a rearwardly extending arcuate flange 60 which, during normal operation of the apparatus, is positioned in the open end of a 'C'-shaped block 61 so as to block an air jet 62 directed across the arms of the block 61. In the event of the filamentary material running-out, the springs 56 and 58 pivot the plate 52 clockwise as viewed in FIG. 4 so that the flange 60 clears the air jet 62 to establish air flow across the block 61 which actuates the fluidic control circuit hereinafter described, to stop operation of the apparatus. The pivotal movement of the plate 52 causes an arcuate flange 63a to interrupt an air jet 69

(FIG. 6) which extends across the arms of a 'C'-shaped block 66 so preventing further count pulses as hereinafter described, for the duration of the stoppage. The pivotal movement of the plate 52 also causes a pad 63 mounted thereon to engage the periphery of the count wheel 45 to prevent excessive movement of the plate 52. Should the material "snag", the roller 41 is moved upwardly, pivoting the plate 52 in a counter-clockwise direction which also has the effect of the flange 60 clearing the jet 62 to establish air flow across the block 61 and so stop operation of the apparatus.

The count wheel 45 is provided with an axially extending flange 64 a portion of which is interrupted as indicated by the reference numeral 65 for approximately 90° of its circumference. The flange 64 is positioned in the open end of a 'C'-shaped block 66 provided with an air jet 69 (which is similar to the air jet 62 in the block 61) so that during rotation of the count wheel 45, as the interrupted portion 65 of the flange 64 coincides with the air jet, air flow is established across the block 66 and an air pulse is fed into the control circuit to indicate and record one revolution of the wheel 45.

A reel of filmentary material 67 is positioned on the base of the apparatus and is reeved through guide members 68 from where it is passed around the rollers 40 to 44 and count wheel 45 as indicated in FIG. 1. From the guide roller 44 the material is passed through the rollers 18, 19 to the cutter 12 through a guide slot 101.

Referring now to the high pressure pneumatic circuit and the low pressure fluidic control circuit as shown in FIG. 6, the high pressure air enters the system through the connection 29 at a pressure of approximately 80 lbs. per square inch and operates the pressure roller 19, air motor 25 and "Airmover" 27a via the high pressure lines 70.

The low pressure air enters the control circuit through the connections 71 at a pressure of approximately 3 lbs. per square inch and operates the logic devices and controls hereinafter described via the low pressure lines 71a.

The control circuit includes three manually operated controls and a "batch complete" indicator all mounted on the door of the apparatus i.e., a start button 72 having a central aperture 73 through which air escapes until operation of the apparatus is required, a stop button 74 having a central aperture 75 through which air excapes unless manual termination of the operation is required, and a counter 76 of known construction which controls the amount of filamentary material cut and dispensed and also provides a safety lock to prevent accidental operation. The counter 76 is an air operated digital counter which is preset to a number equivalent to the amount of fibre required and counts down to zero when it produces an air pressure to stop the apparatus and the "batch complete" indicator is illuminated. It is indexed by the pneumatic pulses produced by the rotating interrupted flange 64 of the count wheel 45 passing through the jet 69, which pulses pass through an amplifier 100. The count wheel 45 is rotated by the filamentary material travelling to the cutter 12. In operation, after the counter is set to the required amount, it counts down to zero and then the "batch complete" indicator is illuminated.

The circuit also includes four automatically operated interlocks comprising a supply pressure interlock 77 which prevents operation of the apparatus if the supply pressure falls below 60 pounds per square inch, a "door-closed" interlock 78 which prevents starting, or operation, of the apparatus unless the door is closed and locked, also the material supply and "snag" interlocks which are both operated by the air jet 62 as herein before described.

In order to commence the cutting and dispensing operation the following conditions must exist:
1. The filamentary material must be correctly reeved and free to run through the apparatus.
2. The door of the cabinet must be closed.
3. The supply pressure must be adequate (i.e., above 60 psi).
4. The counter must be reset and under these conditions:
   1. The air flow from the air jet 62 of the material sensor is interrupted.
   2. The air flow from the door sensor 78 is cut off by being "nipped" between the door and the cabinet.
   3. The air supply to the pressure sensor 77 is "vented".
   4. The air supply to the manual stop button 74 is "vented".
   5. There is no air signal from the counter 76.

Thus, the output air signal from an OR/NOR gate 80 is from its port 81 which provides one input signal into an AND gate 82 through a port 83. The air signal output from the counter 76 is zero. The output signal from a FLIP-FLOP 84 is from its exhaust port 85.

Applying a finger to the start button 73 causes a signal air flow to a second input port 86 of the AND gate 82 thus enabling it to send an air signal to the FLIP-FLOP 84 through its port 87 which causes the output signal to transfer to its port 88. This output flows freely through a check valve 89 to operate a motor control valve 90 via a capacitor 96 and slowly through a restrictor 91 to fill a capacitor 92 which continues until sufficient pressure is built-up to operate a step-up relay 93 which supplies high pressure air through the line 70 to the piston-and-cylinder arrangement 24 of the pressure roller 19. This arrangement provides a time delay between the starting of the air motor 25 and the engagement of the pressure roller 19 with the feed roller 18 which ensures that the cutter 12 is rotating at the required speed and that the "Airmover" 27a, powered by the motor exhaust, is also operating efficiently before the feeding of the filamentary material commences.

Having started, the cutter 12 normally operates until the counter 76 counts down to zero and so produces an air signal which passes into the FLIP-FLOP 84 through a port 94 and causes the output from the FLIP-FLOP to switch back to the port 85. This causes the step-up relay control air to exhaust rapidly through a check valve 95, thus releasing the pressure on the pressure roller 19 and terminating the feeding of the material, whilst control air from the capacitor 96 exhausts slowly through the restrictor 97 until the pressure falls sufficiently for the control valve 90 to stop the motor 25. Thus, the feeding of the filamentary material is rerminated before the speed of the motor 25 is reduced.

Should any of the conditions for safe operation cease to exist, the apparatus will fail to start or cease to operate i.e., if the filamentary material snags, or if the door is open, or if the air pressure is low, an air signal entering the OR/NOR gate 80 through a port 98 switches its output to a port 99 which, in turn, transfers the output from the FLIP-FLOP 84 to the exhaust port 85.

It will be appreciated that the counting and other operations can be effected electronically, or by electromechanical means.

We claim:

1. Apparatus for severing and dispensing fibrous material comprising, a rotatable cutter, feed rollers for supplying the material to the cutter, a plurality of rollers which guide the material to the feed rollers having certain of said guide rollers pivotally mounted relatively to the remaining guide rollers, said pivotally mounted rollers operating an interlock mechanism which prevents operation of the apparatus in the absence of material, or if it snags and means effecting separation of the feed rollers after a predetermined quantity of the material has been dispensed.

2. Apparatus as claimed in claim 1 including a count wheel over which the material passes during operation of the apparatus the revolutions of said count wheel being recorded by a counter mechanism.

3. Apparatus as claimed in claim 2, wherein the cutter is driven by a motor which also drives one of said feed rollers.

4. Apparatus as claimed in claim 3, wherein the other feed roller is urged, when required, into contact with said driven roller.

5. Apparatus as claimed in claim 4, wherein movement of said other feed roller is effected by a fluid-pressure operated device, said separation being effected upon termination of the fluid pressure.

6. Apparatus as claimed in claim 5, wherein said device comprises a pneumatically operated piston-and-cylinder arrangement, the piston of which is connected to a pivotally-mounted arm which supports said other feed roller.

7. Apparatus as claimed in claim 6, wherein said cutter motor is also pneumatically operated and connected with an air conveyor which conveys the severed material from the apparatus.

8. Apparatus as claimed in claim 7, including an interlock mechanism which only permits operation of the apparatus when the air pressure is above a predetermined value.

9. Apparatus as claimed in claim 8, wherein said interlock and counter mechanism are pneumatically operated.

10. Apparatus as claimed in claim 7, including an interlock mechanism which only permits operation of the apparatus when the door of the apparatus is closed.

11. Apparatus as claimed in claim 10, wherein said interlock and counter mechanisms are pneumatically operated.

12. Apparatus as claimed in claim 9, wherein said certain rollers are mounted on a pivotally mounted plate having a portion which, during normal operation of the apparatus, blocks the passage of air across a jet, but which, in the event of the material running out or "snagging", clears the jet to establish air flow there across and so stop the apparatus.

13. Apparatus as claimed in claim 9, wherein said count wheel has an interrupted flange operatively associated with an air jet, the arrangement being such that during rotation of the count wheel, air flow is established across the jet once per revolution, the air pulse so created being fed to said counter mechanism.

14. Apparatus as claimed in claim 1, wherein the cutter is provided with a plurality of teeth which sequentially co-act with a stationary anvil to effect severance of the material.

15. Apparatus as claimed in claim 14, wherein the cutting edges of said cutter teeth and anvil tipped with an abrasion resistant material.

* * * * *